United States Patent
Koblick

(10) Patent No.: US 12,078,716 B2
(45) Date of Patent: Sep. 3, 2024

(54) SYSTEM AND METHOD OF HYPERSONIC OBJECT TRACKING

(71) Applicant: Raytheon Company, Tewksbury, MA (US)

(72) Inventor: Darin C. Koblick, El Segundo, CA (US)

(73) Assignee: Raytheon Company, Tewksbury, MA (US)

( * ) Notice: Subject to any disclaimer, the term of this patent is extended or adjusted under 35 U.S.C. 154(b) by 709 days.

(21) Appl. No.: 17/007,361

(22) Filed: Aug. 31, 2020

(65) Prior Publication Data

US 2022/0065587 A1 Mar. 3, 2022

(51) Int. Cl.
| | |
|---|---|
| *G01S 13/72* | (2006.01) |
| *G01S 13/58* | (2006.01) |
| *F41G 7/30* | (2006.01) |
| *G01C 21/20* | (2006.01) |
| *G01S 5/02* | (2010.01) |

(52) U.S. Cl.
CPC .............. *G01S 13/72* (2013.01); *G01S 13/58* (2013.01); *F41G 7/303* (2013.01); *G01C 21/20* (2013.01); *G01S 5/0294* (2013.01)

(58) Field of Classification Search
CPC ... F41G 7/303; G01C 21/20; G01S 13/58–64; G01S 13/66–726; G01S 5/0294; G01S 17/66
See application file for complete search history.

(56) References Cited

U.S. PATENT DOCUMENTS

| | | | |
|---|---|---|---|
| 6,708,116 B2 | 3/2004 | Wright | |
| 7,991,192 B2 * | 8/2011 | Lee | ............................ G06T 7/73 |
| | | | 250/203.1 |

(Continued)

FOREIGN PATENT DOCUMENTS

| | | | | |
|---|---|---|---|---|
| CN | 104793201 A | * | 7/2015 | ............. G01S 13/66 |
| JP | 5424662 B2 | * | 2/2014 | |
| KR | 20160110773 A | * | 9/2016 | |

OTHER PUBLICATIONS

H. Cui, W. Liu, S. Zhu and C. Wen, "A hypersonic vehicle tracking algorithm based on the UKF generalized labeled multi-Bernoulli filter," 2016 35th Chinese Control Conference (CCC), Chengdu, China, 2016, pp. 4911-4916, doi: 10.1109/ChiCC.2016.7554116. (Year: 2016).*

(Continued)

*Primary Examiner* — Matthew M Barker
(74) *Attorney, Agent, or Firm* — Schwegman Lundberg & Woessner, P.A.

(57) ABSTRACT

A system and method of tracking a hypersonic object over a flightpath includes at least one observer having at least one sensor. The sensor is configured to provide measurements of the hypersonic object that are geometrically diverse such that each observer may independently measure any combination of range, angles, Doppler, and angle rates. The observers transmit measurements to a processing unit as the hypersonic object undergoes three phases including a boost phase, a ballistic phase, and a hypersonic glide phase. The hypersonic object is tracked over many time steps by first selecting a dynamics model representative of expected object kinematics during said phase. Then, an unscented Kalman filter is used to predict a future state and a covariance using the dynamics model that was selected. Finally, the unscented Kalman filter updates the future state and covariance that were predicted based on the geometrically diverse measurements of the sensors.

18 Claims, 6 Drawing Sheets

(56) References Cited

U.S. PATENT DOCUMENTS

| | | | | |
|---|---|---|---|---|
| 9,207,049 | B2* | 12/2015 | Rovinsky | F41G 7/303 |
| 2008/0169968 | A1* | 7/2008 | Easthope | G01S 13/726 |
| | | | | 342/95 |
| 2014/0032167 | A1* | 1/2014 | Mayer | G01D 21/00 |
| | | | | 702/179 |
| 2015/0304634 | A1* | 10/2015 | Karvounis | G06F 18/21355 |
| | | | | 348/46 |
| 2016/0054430 | A1* | 2/2016 | Paluszek | G01S 5/0294 |
| | | | | 702/150 |

OTHER PUBLICATIONS

J. Huang, H. Zhang, G. Tang and W. Bao, "Radar tracking for hypersonic glide vehicle based on aerodynamic model," 2017 29th Chinese Control and Decision Conference (CCDC), Chongqing, China, 2017, pp. 1080-1084, doi: 10.1109/CCDC.2017.7978679. (Year: 2017).*

R. L. Cooperman, "Tactical ballistic missile tracking using the interacting multiple model algorithm," Proceedings of the Fifth International Conference on Information Fusion. Fusion 2002. (IEEE Cat.No. 02EX5997), Annapolis, MD, USA, 2002, pp. 824-831 vol. 2, doi: 10.1109/ICIF.2002.1020892. (Year: 2002).*

Song, Liping and Hongbing Ji. "A Survey of Maneuvering Target Tracking—Part II : Ballistic Target Models." (2001). (Year: 2001).*

M. Yu, L. Gong, H. Oh, W.-H. Chen and J. Chambers, "Multiple Model Ballistic Missile Tracking With State-Dependent Transitions and Gaussian Particle Filtering," in IEEE Transactions on Aerospace and Electronic Systems, vol. 54, No. 3, pp. 1066-1081, Jun. 2018, doi: 10.1109/TAES.2017.2773258 (Year: 2018).*

* cited by examiner

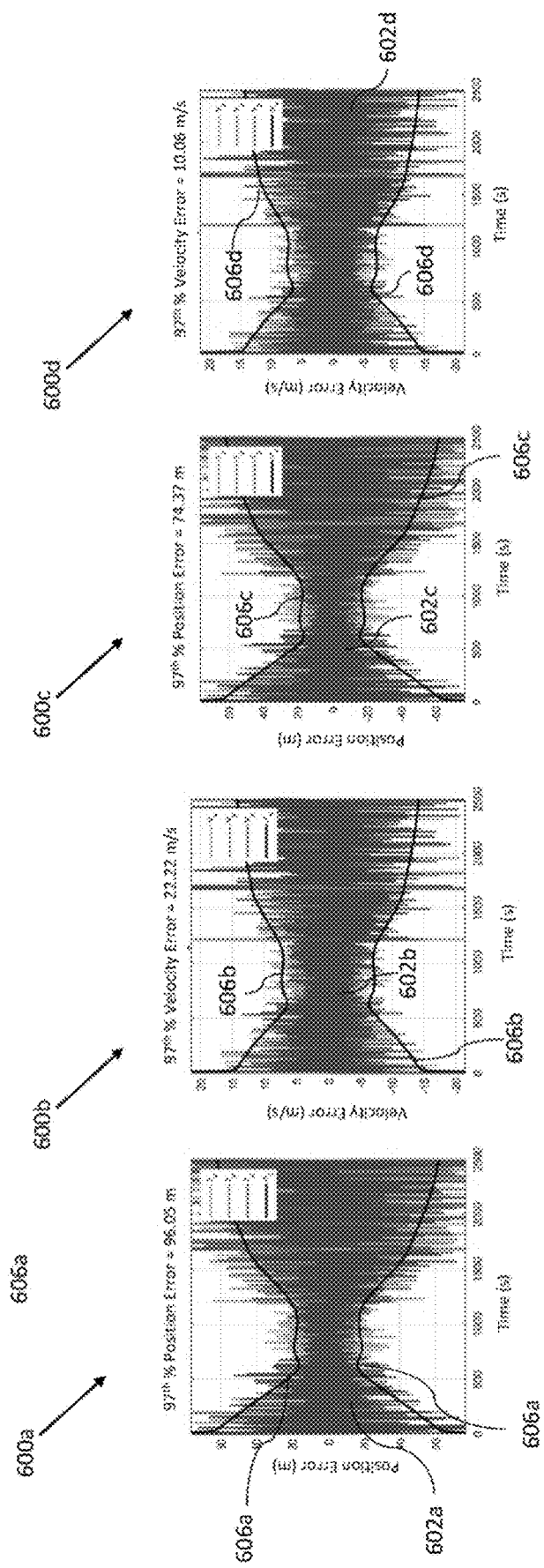

SYSTEM AND METHOD OF HYPERSONIC OBJECT TRACKING

FIELD OF THE TECHNOLOGY

The subject disclosure relates to object tracking and more particularly to tracking hypersonic objects.

BACKGROUND OF TECHNOLOGY

Object tracking technology serves an important role in many industries, including for tracking missiles for military purposes. Most tracking systems employ a dynamics model and estimation method or filter to help predict movement of the object being tracked. However, this can present difficulties when the object is non-linear. Hypersonic missiles present particularly unique challenges, as they change between several phases over the course of a flight and travel non-linearly. Thus, non-linear measuring processes, such as those that rely on a traditional Kalman filter, can fail to accurately estimate the trajectory of the object.

While an attempt could be made to extend the Kalman filter (e.g. "Extended Kalman Filter") to handle the non-linear dynamics needed to model all phases of a hypersonic missile, this could present some serious drawbacks, rendering it an undesirable candidate for both a fast and robust implementation. For example, error propagation is approximated by linear or quadratic functions. If this condition is not met, the performance may be extremely poor or start to diverge. Further, Jacobian matrices need to exist such that the transformation from filter state to measurement can be applied. There may be cases where the dynamic system is jump-linear (e.g. condition where parameters change abruptly such as a vehicle bank reversal or a thruster cutoff). Additionally, calculations of the Jacobian and Hessian matrices are extremely difficult and are prone to human error in both deriving them and programming. These errors make debugging and analyzing complicated. In many cases, computing the derivatives requires more computational power than numerically approximating the transformation between measurement and filter state. Therefore, there is a need to accurately track the flight of a hypersonic object, such as a hypersonic missile, which has a non-linear trajectory.

SUMMARY OF THE TECHNOLOGY

Considering the needs described above, in at least one aspect, the subject technology relates to a method of tracking a hypersonic object over its full flightpath. At least one observer is provided having at least one sensor configured to provide measurements of the hypersonic object that are geometrically diverse such that each observer is configured to independently measure any combination of range, angles, Doppler, and angle rates. The observers transmit data including the measurements of the hypersonic object and uncertainties of the hypersonic object to a processing unit as the hypersonic object undergoes three phases including a boost phase, a ballistic phase, and a hypersonic glide phase. During each phase, the following steps are repeated over a plurality of time steps to track the hypersonic object: selecting a dynamics model representative of expected object kinematics during said phase; using an unscented Kalman filter to predict a future state and a covariance using the dynamics model that was selected; and using the unscented Kalman filter to update the future state and covariance that were predicted based on the geometrically diverse measurements of the sensors.

In some embodiments, tracking the hypersonic object includes integrating a plurality of object dynamics and measurement models consisting of a dissimilar number of states, parameters, reference frames, and time units together using the unscented Kalman filter such that analytical differentiation is avoided and each model functions in a native coordinate system. Each model is interchangeable via numerical state and covariance transformation between coordinate systems, allowing for instantaneous switching between time steps.

In some embodiments, during the boost phase, the dynamics model selected accounts for thrust and gravitational forces on the hypersonic objection. In such a case, during the ballistic phase, the dynamics model selected accounts for standard gravitational forces on the hypersonic objection. And, in such a case, during the glide phase, the dynamics model selected accounts for aerodynamic and random maneuvering forces. In some cases, the phases further include a terminal phase and during the terminal phase, the dynamics model selected accounts for random maneuvers and gravitational forces.

In some embodiments, the observers include a plurality of satellites and ground sensors forming a force mix of low earth satellites and ground sites tracking the hypersonic object from different geometries. In some cases, the satellites include: a first satellite having a sensor configured to measure relative azimuth and elevation angles of the hypersonic object; a second satellite having a sensor configured to measure relative azimuth and elevation angles of the hypersonic object only; and a ground sensor configured to measure both range and angles of the hypersonic object. In some embodiments, the observers include only ground based observers with sensors configured to measure range, azimuth, and elevation of the hypersonic object. In some embodiments, the unscented Kalman filter uses a 9 state or 12 state dynamics model to capture acceleration and jerk maneuvers respectively.

In at least one aspect, the subject technology relates to a system configured to track a hypersonic object over its full flightpath. The system includes at least one observer, each observer including at least one sensor configured to provide geometrically diverse measurements of the hypersonic object such that each observer is configured to independently measure any combination of range, angles, Doppler, and angle rates. A processing unit, wherein each observer is configured to transmit data including the measurements of the hypersonic object and uncertainties of the hypersonic object to the processing unit as the hypersonic object undergoes three phases including a boost phase, a ballistic phase, and a hypersonic glide phase. During each phase, the processing unit is configured to repeat the following steps over a plurality of time steps to track the hypersonic object: selecting a dynamics model representative of expected object kinematics during said phase; using an unscented Kalman filter to predict a future state and a covariance using the dynamics model that was selected; and using the unscented Kalman filter to update the future state and covariance that were predicted based on the geometrically diverse measurements of the sensors.

BRIEF DESCRIPTION OF THE DRAWINGS

So that those having ordinary skill in the art to which the disclosed system pertains will more readily understand how to make and use the same, reference may be had to the following drawings.

FIG. 6a shows graphs of position and velocity error for a prior art system and method of tracking a hypersonic object.

FIG. 6b shows graphs of position and velocity error of a hypersonic object as tracked by a system and method of the subject disclosure.

DETAILED DESCRIPTION

Figure 1:
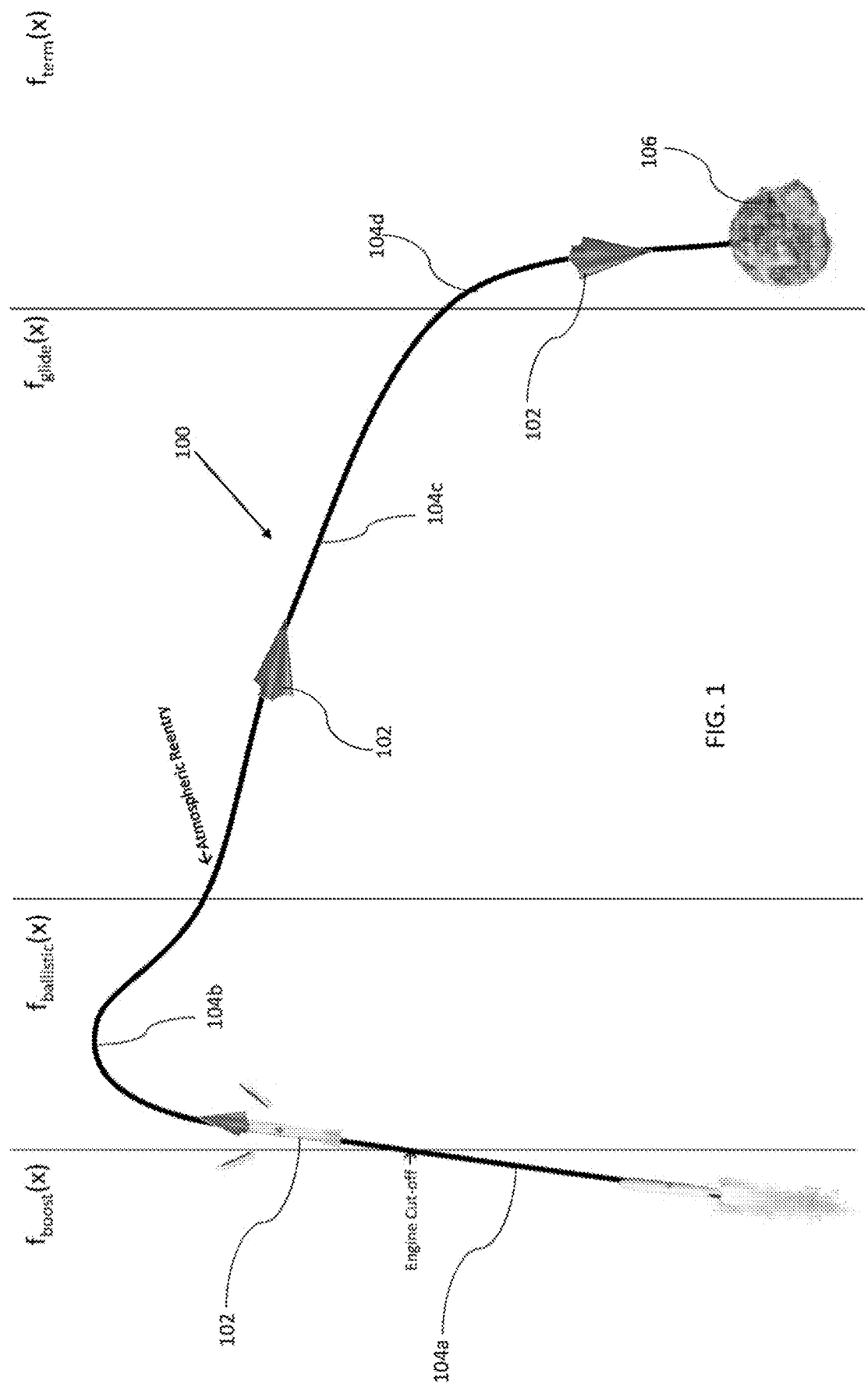
FIG. 1 is an exemplary diagram of a flightpath of a hypersonic missile which can be tracked by a system and method in accordance with the subject disclosure.

The subject technology overcomes many of the prior art problems associated with hypersonic object tracking. The advantages, and other features of the systems and methods disclosed herein, will become more apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Referring now to FIG. 1, an exemplary diagram of a flightpath 100 of a hypersonic missile 102 which can be tracked by a system and method in accordance with the subject technology is shown. Over the course of the flight, the missile 102 experiences several distinct phases 104a-104d (generally 104) of flight. As discussed in more detail below, the subject technology employs different dynamics models for each of these phases 104.

The boost phase 104a is the first phase of the missile flightpath 100. During the boost phase 104a, the missile 102 is launched and boosted until engine burnout. Typically, the missile 102 will experience thrust and standard gravitational forces during the boost phase 104a. Eventually, the engine of the missile 102 will cut off and the missile 102 enters the ballistic phase 104b. During the ballistic phase 104b, the missile 102 no longer experiences external acceleration from thrust, but continues to experience gravitational forces. Here, the missile 102 can potentially leave the atmosphere and primarily experiences gravitational forces, and atmospheric drag. Next, the missile 102 undergoes a glide phase 104c, where it experiences aerodynamic forces which include lift and drag. If the missile 102 previously left the atmosphere, the missile 102 reenters the atmosphere during the glide phase 104c. Finally, the missile 102 enters the terminal phase 104d at it approaches its final target 106. The system disclosed herein utilizes different dynamics equations during each phase 104 of the missile 102 flight, as will be discussed in more detail below.

Figure 2:
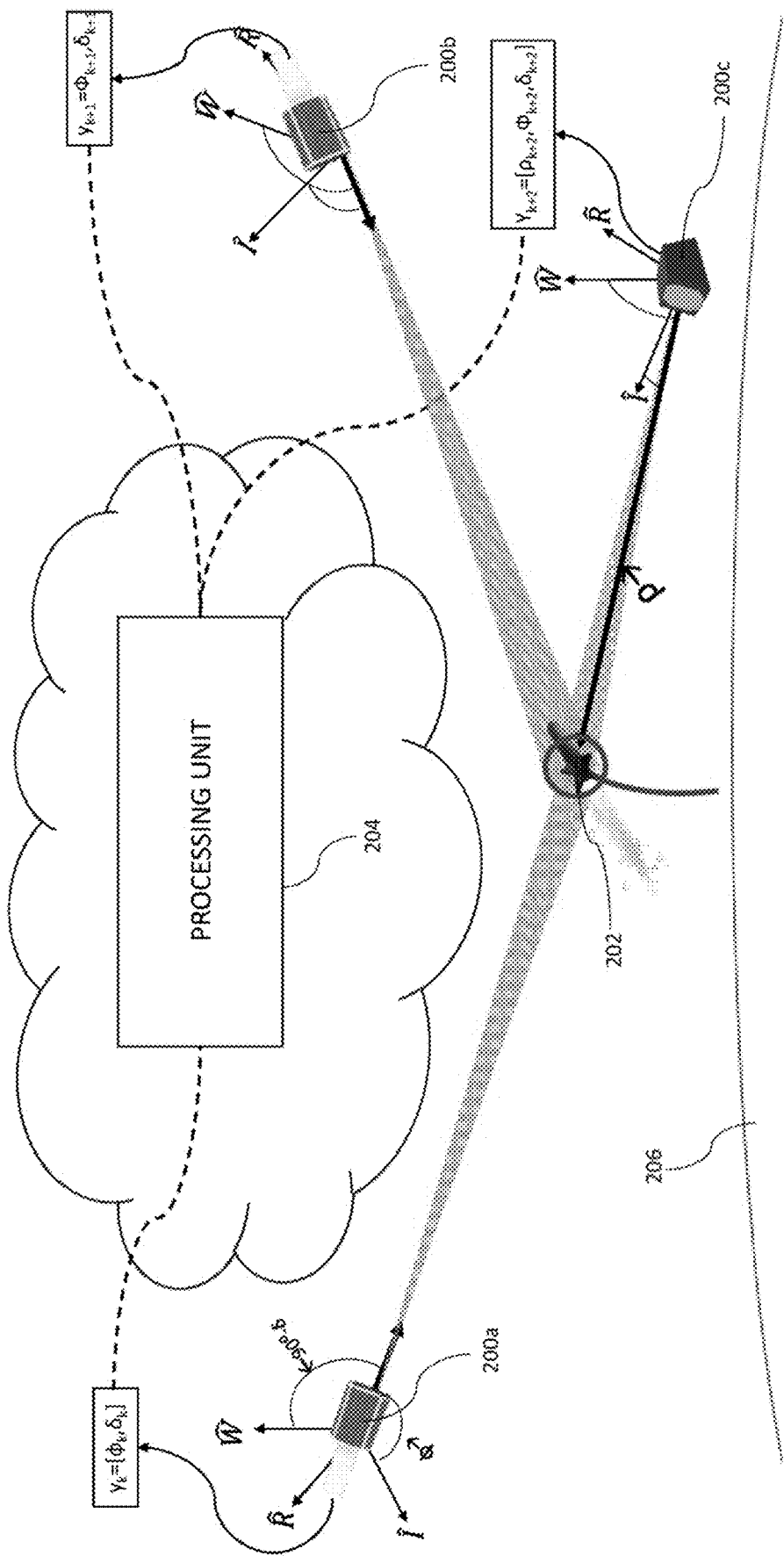
FIG. 2 is a schematic diagram of components of an exemplary system for tracking a missile trajectory in accordance with the subject disclosure.

Referring now to FIG. 2, a schematic diagram of components of an exemplary system for tracking a missile trajectory is shown. The system includes three observers 200a-200c (generally 200), two of which are low earth satellites forming a constellation over the earth 206, one of which (220c) is a ground based radar. Each observer 200 includes one or more sensors which measure characteristics of the missile 202. Each observer 200 tracks the missile 202 from a different geometry. In the example given, the first satellite 200a and the second satellite 200b include angular sensors which measure a relative angle of the missile. The ground observer 200c is a radar which provides angle and range measurements of the missile. The range sensors can be optical, RF, or other types of known sensors, for example. Additionally, or alternatively, other sensors can be utilized, including sensors for measuring Doppler (e.g. range rate) and/or angular rate sensors which measure the angular rate of the moving target with spatially diverse electric field patterns.

Measured characteristics are reported back to a central system, which can include a processing unit 204, such as a central computer or the like. The processing unit 204 includes a processor carried to execute instructions for processing data, and running algorithms for tracking the missile 202 in accordance with the teachings herein. The processing unit 204 can include several modules for carrying out various processing functions, including measurement models, an unscented Kalman filter, coordinate transformations, dynamics models, numerical propagation, an IAU SOFA library, and a matrix math library. The characteristics of the missile 202 measured by the satellites 200 are relied on as to carry out the calculations conducted by the processing unit 204 for tracking the missile 202, as will be discussed in more detail herein. Notably, this setup is exemplary only, and in other embodiments, different numbers of satellites 200, or other known observers or sensors, can be employed. For example, while satellites are shown herein, some embodiments may utilize land, sea, or air based observers in addition to, or in lieu of, the satellites. The terrestrial observers may include sensors to measure range, azimuth, elevation, Doppler, azimuth angular rate, and elevation angular rate to the missile.

Figure 3:
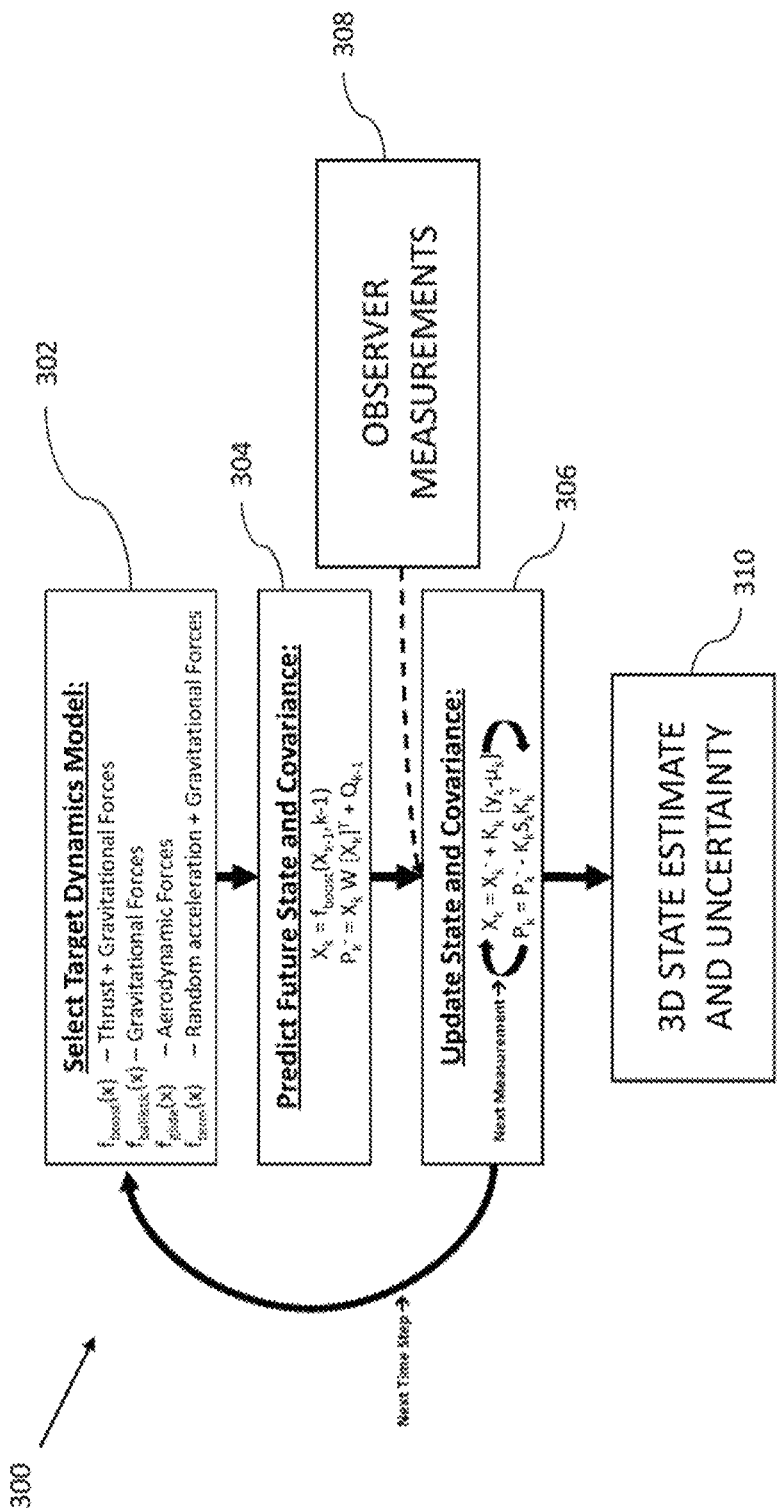
FIG. 3 is a flowchart of an exemplary method of tracking a missile in accordance with the subject disclosure.

Referring now to FIG. 3, a flowchart 300 of an exemplary method of tracking a missile in accordance with the subject technology is shown. The steps of the flowchart can be carried out by a processing unit 204 of the system as shown in FIG. 2 to effectively track a hypersonic object, such as a missile 202. First, at step 302, a target dynamics model is selected based on the phase of the missile at the current time step obtained directly from the kinematics of the trajectory (e.g. altitude, random maneuvers, velocity, and time of flight). The dynamics model is selected based on the expected forces on the missile during a given phase. For example, during the boost phase, a dynamics model is selected which accounts for thrust and gravitational forces on the missile. A boost phase starts when time of flight is equal to zero, the missile altitude is endo atmospheric, the vehicle velocity is less than burnout velocity, and there are observed external maneuvers. During the ballistic phase, a dynamics model is selected which accounts for gravitational forces. During the glide phase, a dynamics model is selected which accounts for aerodynamic forces and random maneuvers. Finally, during the terminal phase, a dynamics model is selected which accounts for random maneuvers and/or gravitational forces. An unscented Kalman filter is then implemented to track the object based on the dynamics model. At step 304, an unscented Kalman filter is used to predict a future state and covariance based on the dynamics model selected. At step 306, observer measurements 308 of the missile are processed to show the actual state of the dynamics model, and the predicted state and covariance and are updated based on the observer measurements 308. A 3D state estimate and uncertainty for the model 310 at a given time step is thereby provided. Steps 302-306 can then be repeated for subsequent time steps over each phase of the missile flightpath for the duration of the missile's flight.

The unscented Kalman filter uses an unscented transform (UT) to provide a Gaussian approximation to the filtering solutions of non-linear optimal filtering problems of the form:

$$x_k = f(x_{k-1}, k-1) + q_{k-1} \quad (1)$$

$$y_k = h(x_k, k) + r_k \quad (2)$$

where $x_k \in \mathbb{R}^n$ is the filter state estimate, $y_k \in \mathbb{R}^m$ is the measurement, $q_{k-1} \sim N(0, Q_{k-1})$ is the Gaussian process noise, and $r_{k-1} \sim N(0, R_k)$ is the Gaussian measurement noise. f(.) represents the non-linear function which propagates the state with respect to time, h(.) represents a non-linear transformation function which converts the current state to measurements relative to a specific observer.

Typically, Kalman filters have two main steps: a prediction (e.g. propagation) step, and an update (e.g. measurement update) step. The UKF implementation, reprinted in matrix form for convenience, utilizes both steps as follows:

Prediction Step: The predicted state mean, $m_k^-$, and covariance, $P_k^-$ are found from:

$$X_{k-1} = [m_{k-1}, \ldots, m_{k-1}] + \sqrt{c}\left[0, \sqrt{P_{k-1}}, \sqrt{P_{k-1}}\right] \quad (3)$$

$$\hat{X}_k = f(X_{k-1}, k-1)$$

$$m_k^- = \hat{X}_k w_n$$

$$P_k^- = \hat{X}_k W [\hat{X}_k]^T + Q_{k-1}.$$

Update Step: The predicted mean, $\mu_k$, covariance of the measurement, $S_k$, cross-covariance of the state and measurement, $C_k$, filter gain, $K_k$, updated state mean, $m_k$, and covariance $P_k$ are computed as:

$$X_k^- = [m_k^-, \ldots, m_k^-] + \sqrt{c}\left[o, \sqrt{P_k^-}, \sqrt{P_k^-}\right] \quad (4)$$

$$Y_k^- = h(X_k^-, k)$$

$$\mu_k = Y_k^- w_m$$

$$S_k = Y_k^- W [Y_k^-]^T + R_k$$

$$C_k = X_k^- W [Y_k^-]^T$$

$$K_k = C_k S_k^{-1}$$

$$m_k = m_k^- + K_k [y_k - \mu_k]$$

$$P_k = P_k^- - K_k S_k K_k^T.$$

The unscented transform can approximate the Gaussian of a joint distribution of random variables x and y of the form:

$$\begin{bmatrix} x \\ y \end{bmatrix} \approx N\left(\begin{bmatrix} m \\ \mu_U \end{bmatrix}, \begin{bmatrix} P & C_U \\ C_U^T & S_U \end{bmatrix}\right) \quad (5)$$

Formally solving the distribution of x and or y is generally impossible as either may be non-Gaussian for all f and h so it is approximated. While an EKF approach may impose that the joint distribution of x and y is either linear or quadratic, a non-augmented unscented transform can approximate it as:

$$X = [m, \ldots, m] + \sqrt{c}[0, \sqrt{P}, -\sqrt{P}] \quad (6)$$

$$Y = g(X) \quad (7)$$

$$\mu_U = Y w_m \quad (8)$$

$$S_U = Y W Y^T \quad (9)$$

$$C_U = X W Y^T, \quad (10)$$

where X a sigma point matrix, g(.) is a general function (either f or h) applied to each column of the argument matrix, $c = \alpha^2(n+K)$, $w_m$ is a vector, W is a matrix defined as:

$$w_m = [W_m^{(0)}, \ldots, W_m^{(2n)}]^T \quad (11)$$

$$W = (I - [w_m, \ldots, w_m]) \times \text{diag}(W_c^{(0)}, \ldots, W_c^{(2)}) \times (I - [w_m, \ldots, w_m])^T \quad (12)$$

A set of 2n+1 sigma points may be computed from the columns of the covariance matrix, P such that:

$$\sqrt{(n+\lambda)P} = \begin{cases} x^{(0)} = m \\ x^{(i)} = m + \left[\sqrt{(n+\lambda)P}\right]_i, i = 1, \ldots, n \\ x^{(i)} = m - \left[\sqrt{(n+\lambda)P}\right]_i, i = n+1, \ldots, 2n \end{cases} \quad (13)$$

with weights defined by:

$$W_m^{(0)} = \lambda/(n+\lambda)$$

$$W_c^{(0)} = \lambda/(n+\lambda) + (1-\alpha^2+\beta)$$

$$W_m^{(i)} = 1/\{2(n+\lambda)\}, i = 1, \ldots, 2n'$$

$$W_c^{(i)} = 1/\{2(n+\lambda)\}, i = 1, \ldots, 2n \quad (14)$$

where $\lambda$ is a scaling parameter defined as $\lambda = \alpha^2(n+\kappa) - n$. $\alpha$, $\beta$, and $\kappa$ are all constants which are hard-coded as $\alpha = 1$, $\beta = 0$, and $\kappa = 3 - n$ in the prediction, correction, and smoothing routines.

The subject technology implements the Rauch-Tung-Striebel smoother, using an unscented transform to compute a Gaussian approximation to the smoothing distribution of step k such that:

$$p(X_k | Y_{1:T}) \sim N(X_k | m_k^s, P_k^s). \quad (15)$$

First, a matrix of sigma points from the non-augmented state variable is formed from via:

$$\tilde{X}_{k-1} = [\tilde{m}_{k-1} \ldots \tilde{m}_{k-1}] + \sqrt{c}[0, \sqrt{\tilde{P}_{k-1}}, -\sqrt{\tilde{P}_{k-1}}], \quad (16)$$

Where:

$$\tilde{m}_{k-1} = \begin{bmatrix} m_{k-1}^T & 0 \end{bmatrix}^T \quad (17)$$

$$\tilde{P}_{k-1} = \begin{bmatrix} P_{k-1} & 0 \\ 0 & Q_{k-1} \end{bmatrix}. \quad (18)$$

Next, the sigma points are propagated through the same non-linear dynamics function used for the kalman filter prediction step in equation (1) such that:

$$\tilde{X}_{k+1} = f(\tilde{X}_k^x, k) + q_k, \quad (19)$$

where $\tilde{X}_k^x$ and $\tilde{X}_k^q$ denote the sigma points corresponding to $x_k$ and $q_k$ respectively. The predicted mean, $m_{k+1}^-$, covariance, $P_{k+1}^-$, and cross-covariance, $C_{k+1}$, are computed by equations (20)-(22) where:

$$m_{k+1}^- = \tilde{X}_{k+1}^{-x} w_m \tag{20}$$

$$P_{k+1}^- = \tilde{X}_{k+1}^{-x} W [\tilde{X}_{k+1}^{-x}]^T \tag{21}$$

$$C_{k+1} = \tilde{X}_{k+1}^{-x} W [\tilde{X}_k^x]^T, \tag{22}$$

noting that $\tilde{X}_{k+1}^{-x}$ represents the propagated sigma points, $\tilde{X}_{k+1}^-$ corresponding to $x_k$. The smoother gain, $D_k$, smoothed mean, $m_k^s$, and smoothed covariance, $P_k^s$, are the found from:

$$D_k = C_{k+1} [P_{k+1}^-]^{-1} \tag{23}$$

$$m_k^s = m_k + D_k [m_{k+1}^s - m_{k+1}^-] \tag{24}$$

$$P_k^s = P_k + D_k [P_{k+1}^s - P_{k+1}^-] D_k^T. \tag{25}$$

A range, angle, range rate (Doppler), and angular rate measurement model is utilized as part of the present system and now discussed. Many times, an observer may by space-based and directly measuring Doppler and angular rates of a moving target with spatially diverse electric field patterns. For this situation, a measurement model and natural coordinate system which provides support for range and angular rate measurements would be the best choice. The RSW satellite coordinate system was selected for its direct transformation from ECI coordinates, the common Cartesian coordinate reference frame of space-based observers and targets.

Figure 4:
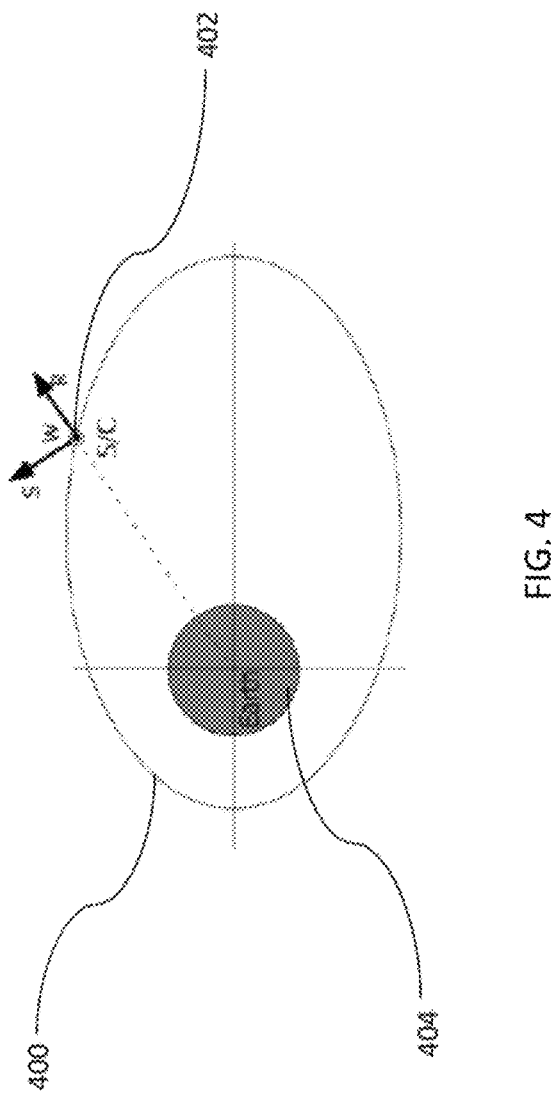
FIG. 4, an exemplary satellite orbit of an observer as part of a system in accordance with the subject disclosure.

Referring to FIG. 4, an exemplary satellite orbit 400 of an observer 402 around earth 404 is shown. Positions of the satellite 400 orbit 402 are represented in the RSW frame as the R-axis is aligned with the Radial position, the S-axis is aligned with the Along-Track displacement of the observer 402, and the W-axis is aligned with the orbital momentum, or Normal vector to the observer's orbital plane.

The transformation matrix between the observer ECI reference frame and the RSW reference frame is found from the transformations of each axis:

$$\hat{R} = \frac{\vec{R}_I}{|\vec{R}_I|} \tag{39}$$

$$\hat{S} = \hat{W} \times \hat{R} \tag{40}$$

$$\hat{W} = \frac{\vec{R}_I \times \vec{V}_I}{|\vec{R}_I \times \vec{V}_I|} \tag{41}$$

such that the transformation matrix to convert an ECI position vector to an RSW position vector is provided by:

$$R_{ECI}^{RSW} = \begin{bmatrix} \hat{R} \\ \hat{S} \\ \hat{W} \end{bmatrix} \tag{42}$$

where, given the inertial vector of the target, $\vec{r}_I$, and the inertial vector of the observer, the RSW reference frame vector of the target with respect to the observer is found from $$\vec{\rho}_{RSW} = R_{ECI}^{RSW} (\vec{r}_I - \vec{R}_I) \tag{43}$$

A similar approach is used to determine the velocity vector of the target relative to the observer in the RSW reference frame:

$$\dot{\vec{\rho}}_{RSW} = R_{ECI}^{RSW} (\vec{v}_I - \vec{V}_I) + \dot{R}_{ECI}^{RSW} (\vec{r}_I - \vec{R}_I) \tag{44}$$

where the derivative of the transformation matrix to convert from an ECI position vector to an RSW position vector is:

$$\dot{R}_{ECI}^{RSW} = \begin{bmatrix} \dot{\hat{R}} \\ \dot{\hat{S}} \\ \dot{\hat{W}} \end{bmatrix} \tag{45}$$

and the derivatives of each axis are found from:

$$\dot{\hat{R}} = \frac{\vec{V}_I}{|\vec{R}_I|} - \frac{\vec{R}_I (\vec{R}_I \cdot \vec{V}_I)}{|\vec{R}_I|^3} \tag{46}$$

$$\dot{\hat{S}} = \hat{W} \times \dot{\hat{R}} + \dot{\hat{W}} \times \hat{R} \tag{47}$$

$$\dot{\hat{W}} = \frac{\vec{R}_I \times \vec{A}_I}{|\vec{R}_I \times \vec{V}_I|} - \frac{[\vec{R}_I \times \vec{V}_I][\vec{R}_I \times \vec{A}_I]^T}{|\vec{R}_I \times \vec{V}_I|^3} \circ [\vec{R}_I \times \vec{V}_I]. \tag{48}$$

next, the range and angle measurements in the RSW reference frame are found from:

$$\rho = |\vec{\rho}_{RSW}| \tag{49}$$

$$az = \tan^{-1}\left(\frac{\rho_S}{-\rho_R}\right) \tag{50}$$

$$el = \sin^{-1}\left(\frac{\rho_W}{\rho}\right) \tag{51}$$

and their respective derivatives are:

$$\dot{\rho} = \frac{\vec{\rho}_{RSW} \cdot \dot{\vec{\rho}}_{RSW}}{\rho} \tag{52}$$

$$\dot{az} = \frac{\rho_S \dot{\rho}_R - \rho_R \dot{\rho}_S}{\rho_R^2 + \rho_S^2} \tag{53}$$

$$\dot{el} = \frac{\dot{\rho}_W - \dot{\rho} \sin(el)}{\sqrt{\rho_R^2 + \rho_S^2}} \tag{54}$$

The RSW range, azimuth, and elevation convention is the preferred way to run the unscented Kalman filter in the present system as its hidden the azimuth 180 degree singularity opposite the observers along-track vector as well as the 90 degree elevation angle singularity along the orbital momentum vector of the observer.

A range and angle measurement model in ECEF which can be utilized as part of the present system is now discussed. The ECEF to Range, Azimuth, and Elevation measurement model is created for sensor platforms pointing at targets somewhere near the nadir direction, and target information provided in range/az/el measurements relative to the local vehicle platform, all with respect to the Earth Centered Earth Fixed Coordinate system instead of the traditional Earth Centered Earth Inertial frame of reference.

The vehicle coordinate frame is represented with respect to the observer ECEF position, $\vec{R}_{ECEF}$, and velocity, $\vec{V}_{ECEF}$, vectors of, this may be provided to the filter in the form of an Object Sighting Message (OSM):

$$\hat{X}_{RSW} = \hat{R}_{ECEF} \tag{55}$$

$$\hat{Y}_{RSW} = \hat{Z}_{RSW} \times \hat{X}_{RSW} \tag{56}$$

$$\hat{Z}_{RSW} = \frac{\vec{R}_{ECEF} \times \vec{V}_{ECEF}}{|\vec{R}_{ECEF} \times \vec{V}_{ECEF}|} \tag{57}$$

the transformation matrix to convert an ECEF position vector to a local space vehicle reference frame is found from:

$$R_{ECEF}^{RSW} = \begin{bmatrix} \hat{X}_{RSW} \\ \hat{Y}_{RSW} \\ \hat{Z}_{RSW} \end{bmatrix} \tag{58}$$

once the observer position vector in the ECEF frame, $\vec{r}_{ECEF}$, is found, or estimated, it can be converted to the RSW frame as shown below:

$$\vec{\rho}_{RSW} = R_{ECEF}^{RSW}(\vec{r}_{ECEF} - \vec{R}_{ECEF}) \tag{59}$$

next, the range and angle measurements are computed with respect to the RSW frame of reference via:

$$\rho = |\vec{\rho}_{RSW}| \tag{60}$$

$$az = a\tan 2(\rho_S, \rho_R) \tag{61}$$

$$el = a\tan 2(\rho_W, \sqrt{\rho_R^2 + \rho_S^2}) \tag{62}$$

Some object sighting messages contain three LOS angle uncertainties and three angle axis biases which may include: a major axis, $\sigma_a$, a minor axis, $\sigma_b$, and an angle axis, $\sigma_\alpha$. Since these uncertainties apply to the sensor focal plane, they do not directly translate to the inertial angle measurements above. The LOS uncertainties can be approximated with inertial azimuth, $\sigma_{az}$, and elevation, $\sigma_{el}$, measurement uncertainties via:

$$\sigma_{az} = \cos\left(\sigma_\alpha - \tan^{-1}\left[\frac{\sigma_b}{\sigma_a}\right]\right) \cdot \sqrt{\sigma_a^2 + \sigma_b^2} \tag{63}$$

$$\sigma_{el} = \sin\left(\sigma_\alpha + \tan^{-1}\left[\frac{\sigma_b}{\sigma_a}\right]\right) \cdot \sqrt{\sigma_a^2 + \sigma_b^2} \tag{64}$$

The bias value mapping would use the same equations with the appropriate substitution of variables. Notice the increase in measurement uncertainty associated with this transformation which is necessary when converting from a focal plane two-dimensional frame to an inertial three-dimensional spherical coordinate system.

Figure 5:
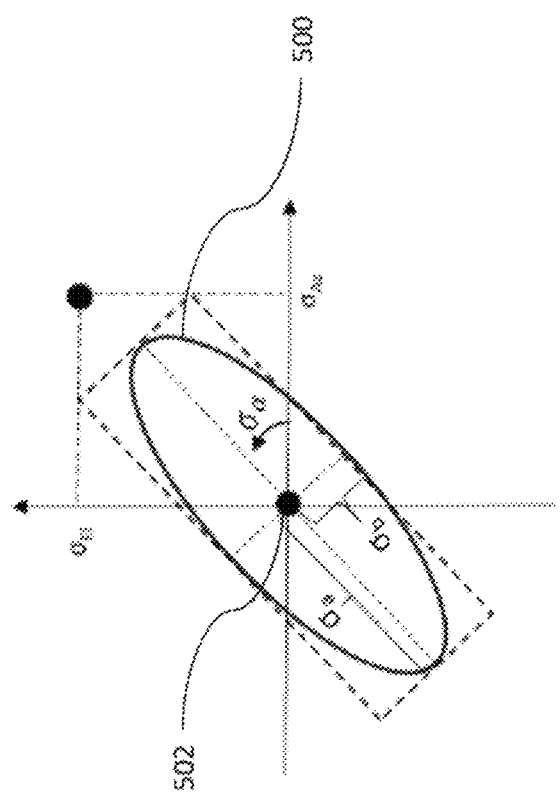
FIG. 5 is a diagram mapping a rotated ellipse for use within the system described herein.

Referring now to FIG. 5, the indirect mapping of a rotated ellipse 500 perpendicular to the sensor line of sight 502 and how it may relate to the inertial azimuth and elevation angle measurements of the target is shown.

The surface area decreases as the elevation angle increases, when using any spherical coordinate system, until it becomes singular at the poles (e.g. el=±90°), we attempt to correct for this knowing that the unit sphere surface area of a given azimuth and elevation element can be found from:

$$SA = \cos(el) \cdot \Delta el \cdot \Delta az \tag{65}$$

As shown, with the increase in elevation angle, the surface area of the sphere decreases. The azimuth uncertainty and bias angles can be scaled by the elevation angle to maintain a constant surface area regardless of where the sensor is pointing with respect to the local vehicle coordinate system:

$$\sigma_{az} = \frac{\sigma_{az}}{\cos\ el} \tag{66}$$

The measurement models within the subject system automatically scale the azimuth measurement uncertainty based on the predicted elevation angle of the target. Therefore, the user is expected to provide the measurement uncertainty in azimuth at a near zero elevation angle.

A random walk constant acceleration model is now discussed herein. The state dynamics can be modeled as a Markov Random Walk when performing recursive state estimation with a Kalman filter (or similar estimation technique). Consider the constant acceleration, a(t), model for position, x(t), velocity v(t), over a discrete time step, $\Delta t$, such that:

$$x(t + \Delta t) = x(t) + v(t)\Delta t + \frac{1}{2}a(t)\Delta t^2 \tag{67}$$

$$v(t + \Delta t) = v(t) + a(t)\Delta t \tag{68}$$

$$a(t + \Delta t) = a(t) + \Delta t\eta \tag{69}$$

$$\eta \in \mathcal{N}(0, \Delta t\sigma_a^2) \tag{70}$$

The acceleration, a(t), wanders from a(0) with a variance proportional to $t\sigma_a^2$. While the acceleration is not constant over time, the model is considered constant acceleration because the expected acceleration displacement is zero over discrete time steps. Using the standard state-space equation form:

$$\dot{X}^* = AX + q(t), \tag{71}$$

where A is often described as the "state transition" matrix, and Q is the process noise matrix, the dynamic model can be represented in state-space form via:

$$\begin{bmatrix} x \\ v \\ a \end{bmatrix}_{t+\Delta t} = \begin{bmatrix} 1 & \Delta t & \frac{1}{2}\Delta t^2 \\ 0 & 1 & \Delta t \\ 0 & 0 & 1 \end{bmatrix} \begin{bmatrix} x \\ v \\ a \end{bmatrix}_t + \begin{bmatrix} 0 \\ 0 \\ \Delta t \end{bmatrix} w(t) \tag{72}$$

Expanding this into three dimensions, and representing the nine state derivatives, we see that the random walk constant acceleration model contains a simple identity matrix:

$$\frac{d}{dL}\begin{bmatrix} r_x \\ r_y \\ r_z \\ \dot{r}_x \\ \dot{r}_y \\ \dot{r}_z \\ \ddot{r}_x \\ \ddot{r}_y \\ \ddot{r}_z \end{bmatrix} = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}\begin{bmatrix} r_x \\ r_y \\ r_z \\ \dot{r}_x \\ \dot{r}_y \\ \dot{r}_z \\ \ddot{r}_x \\ \ddot{r}_y \\ \ddot{r}_z \end{bmatrix} + q(t). \quad (73)$$

Two-body (ballistic) equations of motion utilized by the system herein are now discussed. For simplicity, the aerodynamic forces such as lift and drag are ignored for ballistic motion and only the gravitational force of the central body is modeled. Using the non-linear two-body equations of motion, the set of three coupled second order derivative can be transformed to a set of six coupled first order derivatives. The two body equations of motion are provided as:

$$\frac{d}{dt}\begin{bmatrix} r_x \\ r_y \\ r_z \\ \dot{r}_x \\ \dot{r}_y \\ \dot{r}_z \end{bmatrix} = \begin{bmatrix} 0 & 0 & 0 & 1 & 0 & 0 \\ 0 & 0 & 0 & 0 & 1 & 0 \\ 0 & 0 & 0 & 0 & 0 & 1 \\ -\frac{\mu}{r^3} & 0 & 0 & 0 & 0 & 0 \\ 0 & -\frac{\mu}{r^3} & 0 & 0 & 0 & 0 \\ 0 & 0 & -\frac{\mu}{r^3} & 0 & 0 & 0 \end{bmatrix}\begin{bmatrix} r_x \\ r_y \\ r_z \\ \dot{r}_x \\ \dot{r}_y \\ \dot{r}_z \end{bmatrix} + q(t) \quad (74)$$

where $\vec{r}$ is the inertial position vector of the object, $\dot{\vec{r}}$ is its velocity, and μ is the standard gravitational parameter. These equations can be integrated using a first order numerical ordinary differential equation (ODE) solver such as a Runge-Kutta method.

Two-body equations of motion with unknown acceleration utilized by the system herein are now discussed. Modeling target motion in three dimensional space, including position derivatives up to second order, may be useful for maneuverable targets such as missiles during their "boost phase" where the acceleration of the engine or other external forces is roughly Gaussian and can be modeled by process noise. The state equation for a generic ballistic model with unknown acceleration terms is described as:

$$\frac{d}{dt}\begin{bmatrix} r \\ \dot{r} \\ \ddot{r} \end{bmatrix} = \begin{bmatrix} 0 & 1 & 0 \\ 0 & 0 & 1 \\ 0 & 0 & 0 \end{bmatrix}\begin{bmatrix} r \\ \dot{r} \\ \ddot{r} \end{bmatrix} + \begin{bmatrix} 0 \\ 0 \\ 1 \end{bmatrix}w(t) \quad (75)$$

where r, $\dot{r}$, $\ddot{r}$ are the position, velocity, and accelerations of the target respectively. Using only the gravitational acceleration of the central body, and including all three degrees of freedom, equation (75) can be represented in standard state-space form as:

$$\frac{d}{dt}\begin{bmatrix} r_x \\ r_y \\ r_z \\ \dot{r}_x \\ \dot{r}_y \\ \dot{r}_z \\ \ddot{r}_x \\ \ddot{r}_y \\ \ddot{r}_z \end{bmatrix} = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ -\frac{\mu}{r^3} & 0 & 0 & 0 & 0 & 0 & 1 & 0 & 0 \\ 0 & -\frac{\mu}{r^3} & 0 & 0 & 0 & 0 & 0 & 1 & 0 \\ 0 & 0 & -\frac{\mu}{r^3} & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}\begin{bmatrix} r_x \\ r_y \\ r_z \\ \dot{r}_x \\ \dot{r}_y \\ \dot{r}_z \\ \ddot{r}_x \\ \ddot{r}_y \\ \ddot{r}_z \end{bmatrix} + q(t) \quad (76)$$

The filter implementation of the ballistic motion model with unknown acceleration components therefore consists of 9 states.

A white noise jerk model utilized by the system herein is now discussed. Modeling target motion in three-dimensional space, including position derivatives up to third order, is useful when modeling highly maneuverable targets such as missiles during their "boost phase". Compared with second derivative models, this jerk model can more accurately track agile target maneuvers which likely contain significant higher order derivatives. The state equation for a generic continuous-time jerk model is described as:

$$\frac{d}{dt}\begin{bmatrix} r \\ \dot{r} \\ \ddot{r} \\ \dddot{r} \end{bmatrix} = \begin{bmatrix} 0 & 1 & 0 & 0 & 0 \\ 0 & 0 & 1 & 0 & 0 \\ 0 & 0 & 0 & 1 & 0 \\ 0 & 0 & 0 & -\alpha & 0 \end{bmatrix}\begin{bmatrix} r \\ \dot{r} \\ \ddot{r} \\ \dddot{r} \end{bmatrix} + \begin{bmatrix} 0 \\ 0 \\ 0 \\ 1 \end{bmatrix}w(t) \quad (77)$$

where r, $\dot{r}$, $\ddot{r}$, and $\dddot{r}$ are the position, velocity, acceleration, and jerk of the target respectively. Using only the gravitational acceleration of the central body, and including all three degrees of freedom, equation (77) can be represented in standard state-space form as:

$$\frac{d}{dt}\begin{bmatrix} r_x \\ r_y \\ r_z \\ \dot{r}_x \\ \dot{r}_y \\ \dot{r}_z \\ \ddot{r}_x \\ \ddot{r}_y \\ \ddot{r}_z \\ \dddot{r}_x \\ \dddot{r}_y \\ \dddot{r}_z \end{bmatrix} = \begin{bmatrix} 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \\ 0 & 0 & 0 & 0 & 0 & 0 & 0 & 0 & 0 & -\alpha & 0 & 0 \\ 0 & 0 & 0 & 0 & 0 & 0 & 0 & 0 & 0 & 0 & -\alpha & 0 \\ 0 & 0 & 0 & 0 & 0 & 0 & 0 & 0 & 0 & 0 & 0 & -\alpha \end{bmatrix}\begin{bmatrix} r_x \\ r_y \\ r_z \\ \dot{r}_x \\ \dot{r}_y \\ \dot{r}_z \\ \ddot{r}_x \\ \ddot{r}_y \\ \ddot{r}_z \\ \dddot{r}_x \\ \dddot{r}_y \\ \dddot{r}_z \end{bmatrix} + q(t). \quad (78)$$

The filter implementation of the jerk model therefore consists of 12 states; with a correlation coefficient, a, determined by the user to indicate how responsive the filter is to maneuvers.

Hypersonic aerodynamic equations of motion utilized by the system herein are now discussed. The three-dimensional equations of motion for a gliding vehicle over a spherical rotating central body are expressed in terms of six non-dimensional variables:

$$\dot{r} = V\sin\gamma \quad (79)$$

$$\dot{\theta} = \frac{V\cos\gamma\sin\psi}{r\cos\phi} \quad (80)$$

$$\dot{\phi} = \frac{V\cos\gamma\cos\psi}{r} \quad (81)$$

$$\dot{V} = -D - \frac{\sin\gamma}{r^2} + \Omega^2 r\cos\phi(\sin\gamma\cos\phi - \cos\gamma\sin\phi\cos\psi) \quad (82)$$

$$\dot{\gamma} = \frac{1}{V}\left[L\cos\sigma + \left(V^2 - \frac{1}{r}\right)\left(\frac{\cos\gamma}{r}\right) + \right. \quad (83)$$

$$\left. 2\Omega V\cos\phi\sin\psi + \Omega^2 r\cos\phi(\cos\gamma\cos\phi + \sin\gamma\cos\psi\sin\phi)\right]$$

$$\dot{\psi} = \frac{1}{V}\left[\frac{L\sin\sigma}{\cos\gamma} + \frac{V^2}{r}\cos\gamma\sin\psi\tan\phi - \right. \quad (84)$$

$$\left. 2\Omega V(\tan\gamma\cos\psi\cos\phi - \sin\phi) + \frac{\Omega^2 r}{\cos\gamma}\sin\psi\sin\phi\cos\phi\right]$$

where r is the radial distance from the center of the central body, θ and φ are the longitude and latitude respectively, V is the central body relative velocity magnitude, γ is the flight path angle of the central-body relative velocity vector, ψ is the velocity vector heading angle (measured clockwise in the local horizontal plane from the northern direction), σ is the vehicle banking angle, L is the non-dimensional aerodynamic lift acceleration, D is the non-dimensional aerodynamic drag acceleration, and Ω is the non-dimensional central body rotation rate.

The length may be normalized by the central body equatorial radius, $R_0$, in the case of a gliding vehicle over Earth, $R_0$=6,378.135 km, time is normalized by $\sqrt{R_0/g_0}$ where $g_0$=0.00981 km/s², and velocity may be normalized by $\sqrt{g_0 R_0}$. Dimensionless time, t, is expressed as a function of t such that $\tau = t/\sqrt{R_0/g_0}$. The vehicle lift and drag accelerations are calculated from:

$$D = \frac{C_D q S_M}{m} \quad (85)$$

$$L = \frac{L}{D} \cdot D, \quad (86)$$

where $C_D$ is the vehicle coefficient of drag, L/D, is the Lift-to-Drag ratio which can be directly determined from the coefficient of lift over the coefficient of drag (e.g.

$$\frac{c_L}{c_D}$$

), q is the dynamic pressure, q=0.5 pV², $S_M$ is the HGV cross sectional reference area, m is the vehicle mass, and p is the mass air density. Using a variant of the U.S. Standard Atmosphere 1976 model, the mass density of air is modeled as a function of height, h:

$$\rho = 1.225 \times 10^{-0.1133\,h}. \quad (87)$$

Note: this air density model is presented for simplicity as the US Naval Research Laboratory MSISE-00 Atmosphere Model is also incorporated and may be invoked from this hypersonic aerodynamics model as well.

Written in the state-space model form, the seven equations of motion describing a hypersonic glide vehicle are given by:

$$\frac{d}{d\tau}\begin{bmatrix} r \\ \theta \\ \phi \\ V \\ \gamma \\ \psi \\ \sigma \end{bmatrix} = \begin{bmatrix} \dot{r} \\ \dot{\theta} \\ \dot{\phi} \\ \dot{V} \\ \dot{\gamma} \\ \dot{\psi} \\ 0 \end{bmatrix} + q(\tau) \quad (88)$$

where the six derivatives as calculated from equations (79)-(84). The derivative of the bank angle is assumed to be zero such that its uncertainty is bounded by the process noise term. Measurements at each observer location can be predicted one step ahead with this force model and compared to the actual measurement. If the predicted measurement is greater than three standard deviations RSS from the reported measurement uncertainties for the observer, the covariance for the banking angle can be increased for multiple time steps.

A coordinated turn model which can be utilized by the system described herein is now discussed. Most three-dimensional maneuvering target models are turn motion models, specifically coordinated turn models. Coordinated turn models rely on the underlying kinematics in contrast to other models which are based on random processes. The present system can implement the standard curvilinear-motion model and represent it in the same non-dimensionalized equations of motion as used in the description of the hypersonic aerodynamic equations of motion:

$$\dot{\theta} = \frac{V\sin\psi}{\cos\phi} \quad (89)$$

$$\dot{\phi} = V\cos\psi \quad (90)$$

$$\dot{V} = 0 \quad (91)$$

$$\dot{\psi} = \omega \quad (92)$$

The three-dimensional equations of motion were reduced to two dimensions with a constant velocity. The rate of change for the heading angle is now assumed to be constant as opposed to an indirect function of the vehicle banking angle. If the vehicle were on a constant altitude plane with a zero flight path angle, these four coupled equations could be expanded to three dimensions knowing that $\dot{r}=\dot{\gamma}==0$ such that:

$$\frac{d}{d\tau}\begin{bmatrix} r \\ \theta \\ \phi \\ V \\ \gamma \\ \psi \end{bmatrix} = \begin{bmatrix} \dot{r} \\ \dot{\theta} \\ \dot{\phi} \\ \dot{V} \\ \dot{\gamma} \\ \dot{\psi} \end{bmatrix} + q(\tau). \quad (93)$$

$r_0$ would be estimated and the change of altitude would purely be controlled by filter process noise, $q_r$. Similarly, the linear acceleration term would fluctuate based on the process noise term $q_V$.

To estimate an orbit with a higher degree of precision, the main forces of nature affecting the satellite must include: non-uniform distribution of Earth's Mass, gravitational effects from the Sun and Moon, atmospheric drag, and solar radiation pressure. The total acceleration acting on a satellite can be written in terms of Cowell's formulation as:

$$\vec{a} = -\frac{\mu}{r^3}\vec{r} + \vec{a}_{nonspherical} + \vec{a}_{drag} + \vec{a}_{3B} + \vec{a}_{SRP} = \vec{a}_p - \frac{\mu}{r^3}\vec{r} \quad (94)$$

where $\vec{a}_{nonspherical}$ is the acceleration due to a nonspherical central body, $\vec{a}_{drag}$ is the acceleration due to atmospheric drag, $\vec{a}_{3B}$ are the accelerations caused by the gravitational forces from the Sun and the Moon, and $\vec{a}_{SRP}$ is the acceleration due to the solar radiation pressure reflecting from the satellite surfaces. The non-uniform distribution of mass may be expressed by the coefficients of spherical harmonics where the potential of a satellite relative to a central body is computed from:

$$U(r, \psi, \lambda) = \frac{\mu}{r}\sum_{n=0}^{\infty}\sum_{m=0}^{n}\left(\frac{a}{r}\right)^n P_{nm}(\sin\psi)[C_{nm}\cos m\lambda + S_{nm}\sin m\lambda] \quad (95)$$

where U is the gravitational potential, r is the satellite distance from the planet center, a is the central body equatorial radius, $\psi$ and $\lambda$ are the latitude and longitude respectively, $P_{nm}$ are the Legendre polynomials of order n and degree m, $C_{nm}$ and $S_{nm}$ are the spherical harmonic coefficients. For speed and accuracy, a geopotential model and was used in conjunction with the Gravity Observation Combination (GOCO) gravity field model. The acceleration contribution imposed purely from this non-uniformity is then determined by:

$$\vec{a}_{nonspherical} = \nabla\left(U - \frac{\mu}{r}\right). \quad (96)$$

Care must be taken to convert from a planet fixed reference frame to an planet inertial frame when dealing with potential. The subject technology supports the GOCO gravity field models, and also other gravity field models as are known in the art. For satellites near Earth, atmospheric drag effects are the most significant forces outside of the perturbations from Earth's oblateness. The system can implement the atmospheric drag model shown as:

$$\vec{a}_{drag} = -\frac{1}{2}\frac{C_D A_\perp}{m}\rho v_{rel}^2 \frac{\vec{v}_{rel}}{|\vec{v}_{rel}|} \quad (97)$$

where $C_D$ is the coefficient of drag, often 2.2, spheres have a value which ranges between 2.0 and 2.1. $A_\perp$ is the cross sectional surface area, normal to the satellites velocity vector, $\vec{v}_{rel}$, m is the satellite mass in kilograms, and $\rho$ is the atmospheric density in kg/m$^3$. For atmospheric density calculations, the NRLMSISE-00 empirical atmospheric model is used to compute the total mass density. The acceleration on the satellite in the ECI reference frame from to third body perturbations, $a_{\oplus 3B}$, of the sun, $\odot$, and the moon, $\mathbb{C}$, can be computed numerically via:

$$\vec{a}_{3B} = \mu_\odot\left(\frac{\vec{r}_{sat\odot}}{r_{sat\odot}^3} - \frac{\vec{r}_{\oplus\odot}}{r_{\oplus\odot}^3}\right) + \mu_\mathbb{C}\left(\frac{\vec{r}_{sat\mathbb{C}}}{r_{sat\mathbb{C}}^3} - \frac{\vec{r}_{\oplus\mathbb{C}}}{r_{\oplus\mathbb{C}}^3}\right) \quad (98)$$

where $\vec{r}_{\oplus\odot}$ is the position of the sun in the ECI reference frame, $\vec{r}_{\oplus\mathbb{C}}$ is the position of the moon in the ECI reference frame, $\vec{r}_{sat\odot}$ is the position of the sun with respect to the satellite, $\vec{r}_{sat\odot} = \vec{r}_{\oplus\odot} - \vec{r}_{\oplus sat}$, and $\vec{r}_{sat\mathbb{C}}$ is the position of the moon with respect to the satellite, $\vec{r}_{sat\mathbb{C}} = \vec{r}_{\oplus\mathbb{C}} - \vec{r}_{\oplus sat}$. $\mu_\oplus$ and $\mu_\mathbb{C}$ are the standard gravitational parameters of the sun and moon respectively.

The acceleration effects from solar radiation pressure can be approximated with the cannon ball model:

$$\vec{a}_{SRP} = -\frac{S_0 \cdot AU^2 \cdot C_R \cdot A_\perp}{m \cdot c \cdot r_{sat\odot}^2}\frac{\vec{r}_{sat\odot}}{r_{sat\odot}} \quad (99)$$

where $S_0$ is the solar constant at one astronomical unit, AU, typically 1367 W/m$^2$, $C_R$ is the coefficient of reflectivity, $A_\perp$ is the cross sectional area of the satellite with respect to the sun vector, m is the satellite mass, and c is the speed of light.

Starting with the non-linear two-body equations of motion in the Earth Centered Inertial (ECI) reference frame, a set of three coupled second order derivatives can be transformed to a set of nine coupled first order derivatives. The differential equations representing the implemented nine state dynamics model in the UKF are provided as:

$$\frac{d}{dt}\begin{bmatrix}r_x\\r_y\\r_z\\\dot{r}_x\\\dot{r}_y\\\dot{r}_z\\w_x\\w_y\\w_z\end{bmatrix} = \begin{bmatrix}0 & 0 & 0 & 1 & 0 & 0 & 0 & 0 & 0\\0 & 0 & 0 & 0 & 1 & 0 & 0 & 0 & 0\\0 & 0 & 0 & 0 & 0 & 1 & 0 & 0 & 0\\a_{p_x}r_x^{-1}-\mu r^{-3} & 0 & 0 & 0 & 0 & 0 & 1 & 0 & 0\\0 & a_{p_y}r_y^{-1}-\mu r^{-3} & 0 & 0 & 0 & 0 & 0 & 1 & 0\\0 & 0 & a_{p_z}r_z^{-1}-\mu r^{-3} & 0 & 0 & 0 & 0 & 0 & 1\\0 & 0 & 0 & 0 & 0 & 0 & 0 & 0 & 0\\0 & 0 & 0 & 0 & 0 & 0 & 0 & 0 & 0\\0 & 0 & 0 & 0 & 0 & 0 & 0 & 0 & 0\end{bmatrix}\begin{bmatrix}r_x\\r_y\\r_z\\\dot{r}_x\\\dot{r}_y\\\dot{r}_z\\w_x\\w_y\\w_z\end{bmatrix} + q(t) \quad (100)$$

where $\vec{a}_p=[a_{p_x}, a_{p_y}, a_{p_z}]$ represents the additional perturbation effects, $\vec{w}=[w_x, w_y, w_z]$ is the white noise vector of covariance $q_w$.

Referring now to FIGS. 6a, 6b, graphs showing the tracking results and error of previously known systems and methods for tracking hypersonic objects are compared to graphs of the results of a system and method in accordance with the subject teachings. The prior art graphs include a graph 600a of estimated position error in meters (y-axis) over flight time in minutes (x-axis) and a graph 600b of estimated velocity error in meters per second (y-axis) over flight time in minutes (x-axis). The graphs 600a, 600b represent the results from the 12 state white noise jerk filter used to track hypersonic objects. Graph line 602a represents the RSS position error of the estimates using the prior art filter. Graph lines 606a represent the filter uncertainty (one standard deviation). Graph 600b looks at RSS velocity error of the prior art, as represented by graph line 602b. Graph lines 606b represent the filter uncertainty (one standard deviation).

Graphs 600c, 600d are similar to graphs 600a, 600b, but are for a system designed in accordance with the teachings herein. Graph 600c includes estimated position error in meters (y-axis) over flight time in minutes (x-axis) while graph 600d includes estimated velocity error in meters per second (y-axis) over flight time in minutes (x-axis) Graph lines 606d represent the filter uncertainty (one standard deviation). Graph 600d looks at RSS velocity error of the present system, which is represented by graph line 602d. As can be seen, the subject technology is able to predict position of a target with increased accuracy (i.e. 74 meters $97^{th}$ percentile RSS position error as compared to 96 meters of the prior art) as well as velocity (i.e. 10 m/s 97th) RSS percentile velocity error as compared to 22 m/s of the prior art).

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A method of tracking a hypersonic object over its full flightpath comprising:
   providing a plurality of observers having at least one sensor configured to provide measurements of the hypersonic object such that each of the observers is configured to independently measure any combination of range, angles, Doppler, and angle rates;
   transmitting, by the observers, data including the measurements of the hypersonic object and uncertainties of the hypersonic object to a processing unit as the hypersonic object undergoes three phases including a boost phase, a ballistic phase, and a hypersonic glide phase; and
   during each phase, repeating the following steps over a plurality of time steps to track the hypersonic object:
      selecting a dynamics model representative of expected object kinematics during said phase;
      using an unscented Kalman filter to predict a future state and a covariance using the dynamics model that was selected; and
      using the unscented Kalman filter to update the future state and covariance that were predicted based on the measurements of the hypersonic object.

2. The method of claim 1, wherein tracking the hypersonic object includes integrating a plurality of object dynamics and measurement models consisting of a dissimilar number of states, parameters, reference frames, and time units together using the unscented Kalman filter, and each model functions in a native coordinate system.

3. The method of claim 2, wherein each model is interchangeable via transformation of a state of the model and uncertainty between coordinate systems, allowing for model switching between time steps.

4. The method of claim 1, wherein:
   during the boost phase, the dynamics model selected accounts for thrust and gravitational forces on the hypersonic objection;
   during the ballistic phase, the dynamics model selected accounts for gravitational forces on the hypersonic object; and
   during the glide phase, the dynamics model selected accounts for aerodynamic forces.

5. The method of claim 4, wherein:
   the phases further include a terminal phase; and
   during the terminal phase, the dynamics model selected accounts for random acceleration and gravitational forces.

6. The method of claim 1, wherein the observers include a plurality of satellites forming a constellation of low earth satellites which observe the hypersonic object from different positions.

7. The method of claim 6, wherein the satellites include: a first satellite having a sensor configured to measure an angle of the hypersonic object only; a second satellite having a sensor configured to measure an angle of the hypersonic object only; a third satellite having sensors configured to measure a range and an angle of the hypersonic object.

8. The method of claim 1, wherein the observers include at least one ground-based observer including sensors configured to measure range, azimuth, and elevation of the hypersonic object.

9. The method of claim 1, wherein the unscented Kalman filter is either a 12 state or 9 state boost-phase unscented Kalman filter.

10. A system configured to track a hypersonic object over its full flightpath comprising:
   at least one observer, each observer including at least one sensor configured to provide measurements of the hypersonic object such that each observer is configured to independently measure any combination of range, angles, Doppler, and angle rates; and
   a processing unit, wherein each observer is configured to transmit data including the measurements of the hypersonic object and uncertainties of the hypersonic object to the processing unit as the hypersonic object undergoes three phases including a boost phase, a ballistic phase, and a hypersonic glide phase, wherein, during each phase, the processing unit is configured to repeat the following steps over a plurality of time steps to track the hypersonic object:

selecting a dynamics model representative of expected object kinematics during said phase;

using an unscented Kalman filter to predict a future state and a covariance using the dynamics model that was selected; and using the unscented Kalman filter to update the future state and covariance that were predicted based on the measurements of the hypersonic object.

11. The system of claim 10, wherein the processing unit is further configured to track the hypersonic object by integrating a plurality of object dynamics and measurement models consisting of a dissimilar number of states, parameters, reference frames, and time units together using the unscented Kalman filter, and each model functions in a native coordinate system.

12. The system of claim 11, wherein the processing unit is configured such that each model is interchangeable via transformation of a state of the model and uncertainty between coordinate systems, allowing for switching between time steps.

13. The system of claim 10, wherein the processing unit is further configured such that:

during the boost phase, the dynamics model selected accounts for thrust and gravitational forces on the hypersonic objection;

during the ballistic phase, the dynamics model selected accounts for gravitational forces on the hypersonic object; and during the glide phase, the dynamics model selected accounts for aerodynamic forces.

14. The system of claim 13, wherein:

the phases further include a terminal phase; and during the terminal phase, the dynamics model selected by the processing unit accounts for random acceleration and gravitational forces.

15. The system of claim 10, wherein the observers include a plurality of satellites forming a constellation of low earth satellites which observe the hypersonic object from different positions.

16. The system of claim 15, wherein the satellites include: a first satellite having a sensor configured to measure an angle of the hypersonic object only; a second satellite having a sensor configured to measure an angle of the hypersonic object only; a third satellite having sensors configured to measure a range and an angle of the hypersonic object.

17. The system of claim 10, wherein the observers may include ground-based observers with sensors configured to measure any combination of range, azimuth, elevation, Doppler, and angular rates of the hypersonic object.

18. The system of claim 10, wherein the unscented Kalman filter is either a 12 state or 9 state boost-phase unscented Kalman filter.

* * * * *